United States Patent [19]

Lane et al.

[11] Patent Number: 4,601,614

[45] Date of Patent: Jul. 22, 1986

[54] ROCKBOLT

[76] Inventors: William L. Lane, Box 373, Viburnum, Mo. 65566; Donald L. Lewis, 111 Birch St., Belgrade, Mo. 63622

[21] Appl. No.: 582,276

[22] Filed: Feb. 22, 1984

[51] Int. Cl.$^4$ ............................................. E21D 20/02
[52] U.S. Cl. ..................... 405/261; 405/269
[58] Field of Search ............... 405/259, 260, 261, 269, 405/288; 52/155, 156, 161; 411/55, 57

[56] References Cited

U.S. PATENT DOCUMENTS

| | | |
|---|---|---|
| 2,092,341 | 9/1937 | De Vries . |
| 2,287,395 | 6/1942 | Reynolds . |
| 2,849,866 | 9/1958 | Flygare et al. . |
| 2,950,602 | 8/1960 | Lang . |
| 3,308,585 | 3/1967 | Fischer . |
| 3,613,495 | 10/1971 | Poo . |
| 4,055,051 | 10/1977 | Finney ............................... 405/261 |
| 4,098,166 | 7/1978 | Lang . |
| 4,224,971 | 9/1980 | Muller . |
| 4,362,440 | 12/1982 | Glaesmann et al. ................. 405/269 |
| 4,461,600 | 7/1984 | Norkus et al. ....................... 405/260 |

OTHER PUBLICATIONS

Underground Excavations in Rock, E. Hoek & E. T. Brown.

*Primary Examiner*—David H. Corbin
*Attorney, Agent, or Firm*—Rogers, Howell, Moore & Haferkamp

[57] ABSTRACT

A rockbolt for installation in a bore in the roof of an underground excavation, such as a tunnel or mine, to support the roof, comprises a sleeve having a closed top and ports in its upper end, a plunger slideably mounted in the sleeve, and hardenable binder material encapsulated in burstable cartridges in the sleeve above the plunger. The rockbolt is inserted into the bore and the plunger is operated either mechanically or by the application of pressurized fluid to the plunger, to extrude the binder material to secure the rockbolt in the bore. A mechanical anchor can be provided on the top of the sleeve so the rockbolt can be tensioned before the binder sets. Alternatively, faster setting binder can be provided in the sleeve below the balance of the binder so that it is the last to be extruded and remains near the top to secure the top to the surrounding rock before the balance of the binder sets so that the rockbolt can be tensioned before the balance of the binder sets.

23 Claims, 6 Drawing Figures

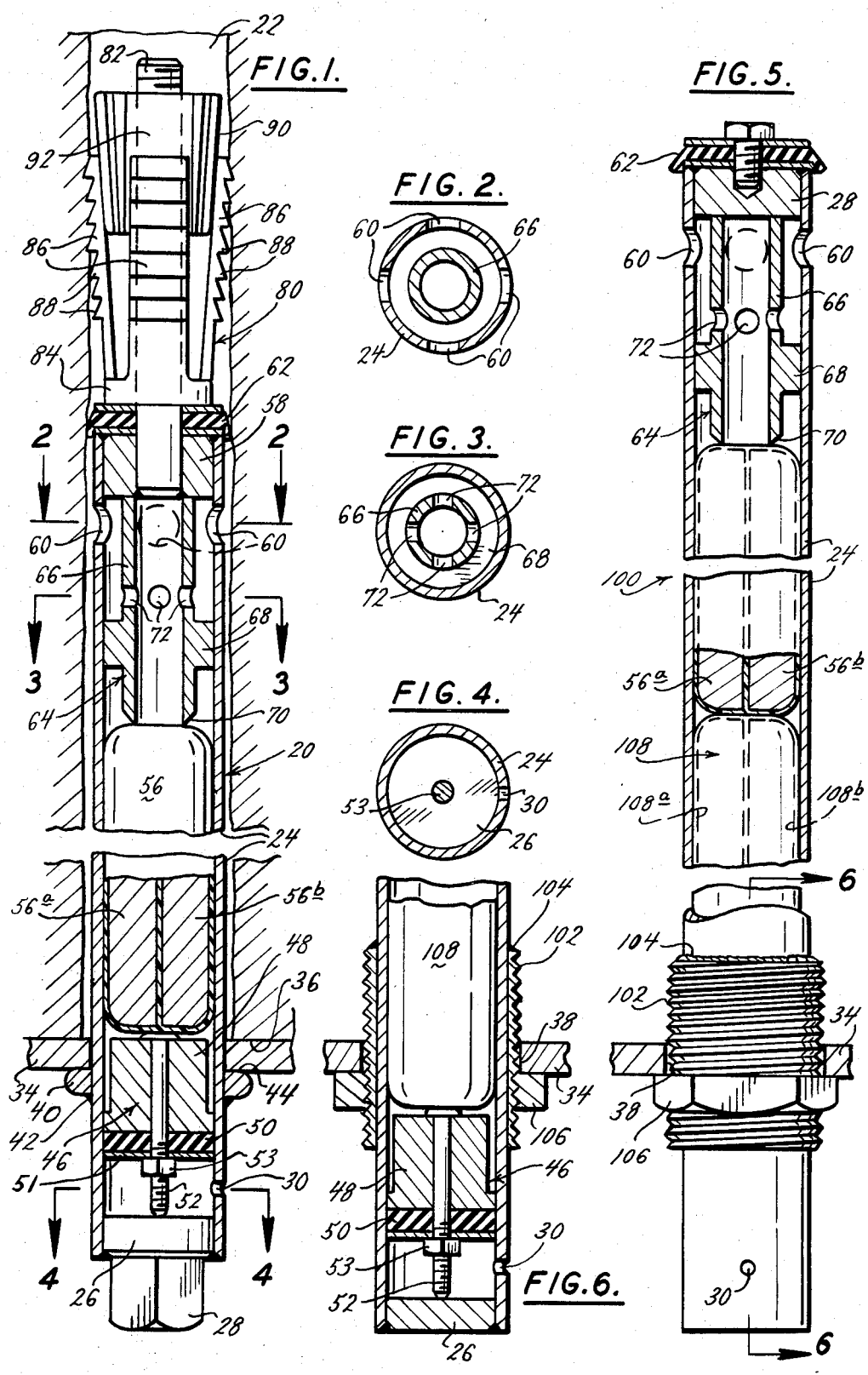

ROCKBOLT

BACKGROUND AND SUMMARY OF THE INVENTION

This invention relates to roof bolts or rockbolts for supporting the roofs of underground excavations, such as tunnels or mines.

Rockbolts are long bolts in the roof of an underground excavation for support. The upper end of the rockbolt is secured in a vertical bore in the roof, while the lower end of the rockbolt engages a faceplate which engages the roof. Rockbolts are not usually used alone, but rather are arranged in a grid-like network in the area to be supported, normally spaced apart in two to four foot intervals. Thus, in a twenty by thirty foot area it would not be uncommon to have sixty or more rockbolts.

Broadly, there are two types of rockbolts: untensioned and tensioned. Untensioned rockbolts engage the rock along substantially the length of the bolt and accept load as the roof deforms, supporting the roof by engaging the overlying rock. Tensioned rockbolts engage the rock at the upper end and at the lower end by a faceplate, and are put in tension which compresses the surrounding rock. In the grid-like pattern in which the bolts are used, this creates ribs of compressed rock across the roof span, which actually act like beams.

Rockbolts have been used for many years, during which time many types have been developed. A good description of prior rockbolts can be found in *Underground Excavations in Rock* by E. Hoek and E. T. Brown, incorporated herein by reference. The first development in untensioned rockbolts was a tight-fitting dried wooden dowel which after insertion would absorb moisture from the surrounding rock and swell to frictionally engage the rock. Wood, however, was weak and it could not be tensioned, so this was an unsatisfactory solution. Various types of metal bolts with expanding anchors have been developed. One such bolt is the Worly bolt, which has a plurality of ramps machined or cast into the bolt, and an anchor member which is driven up the ramps, expanding the bolt. This type of bolt is expensive to manufacture and difficult to install because the bore size was critical to proper engagement. They could not be tensioned and they were subject to corrosion.

The most recent development in untensioned rockbolts is an inflatable rockbolt. One such bolt is commercially known as the Swellex bolt. A collapsed tube is inserted in the bore and high pressure applied to inflate or expand the tube into secure engagement with the bore. Expansion of the tube puts radial stress on the rock which causes it to crack. This bolt can corrode, it is expensive, and it cannot be tensioned. The strength of the bolt is also limited because the walls must be thin enough to flex.

Grout has been used to secure metal rods or wooden dowels in the bores. Grout provides good engagement between the rod and rock and also protects the rod from corrosion. However, large quantities of grout are needed to fill the space between the rod and the rock otherwise larger, more expensive rods would be needed. Furthermore, the bore is usually drilled longer than the rockbolt, and the insertion of the rod pushes a lot of grout up into the dead space above the rockbolt. Grout is very messy and difficult to handle. It generally must be made at the site of use and near the time of use, so extra personnel are needed just to handle the grout. Special equipment is also required to prepare and pump the grout. Even so, large amounts of grout are wasted. Further, the grouted rods generally cannot be tensioned.

One type of grouted rockbolt, often called a perfobolt, consists of two perforated half tubes filled with grout, wired together and inserted in the bore. A rod is driven into the tube, extruding the grout through the perforations. Such a bolt was shown in Flygare, et al., U.S. Pat. No. 2,849,866, which is incorporated by reference herein. This type of bolt was time-consuming to install, and required special equipment, and still could not be tensioned.

More recently, cartridges of hardenable resin and catalyst have been inserted into the bore and punctured and mixed by inserting and turning the rod. This achieves a very secure engagement, but the resins are very expensive and large amounts were used, especially in the larger bores. The problem of pushing the resin into the dead space above the rod increases the amount of resin used. There are difficulties in inserting the cartridges and the rod into the bore and special equipment was often needed. It is difficult to adequately mix the resin so that it sets properly. Adequate mixing is dependant upon the size of the annulus between the bore and the rod, so bore size and rod size are critical. Adequate mixing also requires that the rod be rotated for the prescribed time. This is time consuming, and quality can vary from bolt to bolt, ultimately depending upon the particular installer.

An example of a resined rockbolt is shown in Lang, U.S. Pat. No. 4,098,166, which is incorporated by reference herein. The Lang device has a specially designed rod and faceplate to facilitate the installation of the rod and the mixing of the resin.

Tensioned rockbolts are generally preferred over the untensioned types and the first development in this area was a metal rod having a slotted upper end with a wedge disposed in the slot. The end was secured in the bore by pushing the assembly against the end of the bore to drive the wedge in and expand the rod end. This provided only a small contact area so the rod could slip, and bore length and diameter were critical to proper installation. Corrosion of the rod was also a problem. A mechanical anchor or expansion shell on the end of the rod soon replaced the wedge/slot mechanism because it gave a more secure engagement. These were more expensive, they still provided a relatively small contact area, and the problem of corrosion persisted. Furthermore, the bolts were subject to loosening, as the rock around the anchor weakened under stress. Thus, there are regulations requiring that this type of bolt be periodically retensioned.

The next advance in tensioned rockbolts was to backfill the bore with grout after the rod was tensioned to achive a more secure engagement in the bore and to reduce corrosion. The rod was installed along with tubes through which grout could then be pumped. This bolt was expensive; special equipment was needed to make and handle the grout; correct installation required skilled labor; and the grout tubes were frequently broken during installation. Grout has also been used as the anchor for the rod, in which case the rod and grout tubes would be installed and grout pumped to surround the rod end. Once the grout set, the rod could be tensioned. The problems of handling the grout, of broken grout lines, and of the need for skilled labor persisted.

The latest advance in tensioned rockbolts has been the use of resin cartridges. Fast setting resin cartridges are inserted in the bore first, followed by slow setting resin cartridges. A rod is driven into the bore, bursting the cartridges. The faster setting resin at the top of the rod sets and anchors the rod so that it can be tensioned before the rest of the resin sets. With this system, a lot of expensive resin is required and special equipment is often needed to insert the cartridges and install the rod. The problem of pushing expensive resin into the dead space above the rod also persisted.

Applicants have developed a new type of rockbolt comprising a sleeve with ports at its upper end and containing cartridges of a hardenable binder, such as resin or grout, and a plunger slideably disposed in the sleeve. This rockbolt is simply inserted into the bore and held in place while the plunger is operated to extrude the binder from the ports in the upper end of the sleeve. The plunger can be operated, for example, by the application of air or water pressure, sources of which are readily available from construction or mining equipment likely to be on hand. Such sources may need to be augmented with a pressure intensifying apparatus, and such an apparatus can be mounted to a piece of other equipment or made portable. It is also possible to operate the plunger mechanically, such as by pushing it with a rod. Upon extrusion from the sleeve, the binder travels downward, enveloping the sleeve, and hardens, fixing the rockbolt.

This new rockbolt can also be used as a tensioned rockbolt. A mechanical anchor or expansion shell can be fixed to the top of the sleeve. The anchor can be set to engage the top of the bolt to the rock, the bolt tensioned, and then the plunger can be operated to extrude the binder and secure the sleeve. Another way to use this new rockbolt as a tensioned rockbolt is to put cartridges of fast setting binder in the bottom of the sleeve, so that the fast setting binder is the last to be extruded and remains near the top of the sleeve. Once the fast setting binder sets, the sleeve can be tensioned before the rest of the binder sets.

This invention combines the most desirable features of the prior rockbolts providing a tensioned rockbolt engaged in the surrounding rocks substantially along its length and encased in a binder. The entire rockbolt itself is self-contained. No grout or resin must be pumped into the bore. Thus, no additional parts or supplies are required, eliminating inventory and storage problems. Further, no special tools or equipment are needed to handle the grout or install the rockbolt, resulting in further savings. Because no special equipment is needed for installation, the length of the rockbolt is limited only by the height of the roof, in contrast to some prior rockbolts where installation equipment was placed directly below the bore, reducing the size of the bolt that could be inserted.

Because of the self-contained structure and simple operation, the installer does not need special skill or training. The installation is extremely fast and can be accomplished by just one worker. The quality of installation will not vary from bolt to bolt or depend upon the installer. Because of the simple structure, the rockbolt is relatively easy and inexpensive to manufacture. The same basic structure is easily adapted to a variety of rockbolts—both tensioned and untensioned.

The extrusion of a resin or grout binder results in a tensioned or untensioned rockbolt bonded along its length to the bore. The binder provides secure engagement of the rockbolt to the surrounding rock, but unlike the prior expanding rockbolts, the instant rockbolt is secured without radial stressing and cracking of the surrounding rock. The binder prevents corrosion of the rockbolt. The binder also prevents tensioned rockbolts from loosening, eliminating the need for periodic retensioning. Finally, the binder provides means for verifying the proper operation of the rockbolt, since when binder appears at the faceplate it indicates that the rockbolt has operated properly.

With this new design, the depth of the bore is not as critical as it was to prior grouted or resin rockbolts. The bore can be overdrilled and there will be no problem of pushing the grout or resin into the dead space above the rockbolt. Nor is the bore size or bolt size critical to proper mixing of the binder components as it was with the prior resin rockbolts. The resin is mixed as it is extruded, so the annulus size is not important to mixing. However, since resin or grout is only needed between the outside of the sleeve and the bore wall, by properly selecting the sleeve size, the amount and expense of binder can be significantly reduced. Because of this reduction in the amount of binder used, more effective epoxy type resin, previously too costly to be used, can be used. Thus, even better engagement between the rockbolt can be achieved than with the prior resined or grouted bolts.

BRIEF DESCRIPTION OF THE DRAWINGS

FIG. 1 is a partial longitudinal cross-sectional view of a bore containing a first embodiment of a rockbolt incorporating the invention with the middle portion omitted;

FIG. 2 is an axial cross-sectional view of the rockbolt of FIG. 1 taken along the plane of line 2—2 in FIG. 1;

FIG. 3 is an axial cross-sectional view of the rockbolt of FIG. 1 taken along the plane of line 3—3 in FIG. 1;

FIG. 4 is an axial cross-sectional view of the rockbolt of FIG. 1 taken along the plane of line 4—4 in FIG. 1;

FIG. 5 is a partial longitudinal cross-sectional view of a second embodiment of a rockbolt incorporating the invention with the middle portion omitted;

FIG. 6 is partial cross-sectional view of the lower end of the rockbolt of FIG. 5.

DETAILED DESCRIPTION OF THE PREFERRED EMBODIMENT

In FIG. 1, a first embodiment of a rockbolt incorporating the invention, indicated generally as 20, is shown as it would be installed in a bore 22 in the roof of an underground excavation, such as a tunnel or mine.

Rockbolt 20 comprises a cylindrical sleeve 24, preferably sized to closely conform to bore 22. Applicants have successfully used a sleeve sized to leave an ⅛ inch (0.32 cm) annulus between the sleeve and the bore wall. The lower end of sleeve 24 is closed with end plug 26, which has a depending knob 28 of square cross-section. A fluid injection port 30 is provided in the sidewall of sleeve 24 near the lower end. Port 30 is positioned so that it can be readily connected to a source of pressurized fluid (for example water or air).

A face plate 34 engages the roof surface 36 and has a hole 38 through which sleeve 24 passes. A ring 40 is attached, as by welds at 42, to the outside of sleeve 24, near the lower end but above valve 30. Ring 40 forms shoulder 44 which engages face plate 34.

In sleeve 24 above port 30 is a plunger 46 that is slideably disposed in sleeve 24, as shown, but which has sealing means to prevent leakage when pressurized fluid is introduced below plunger 46 through port 30. Plunger 46 comprises block 48 and resilient sealing disk 50 compressed between block 48 and washer 51 and secured with bolt 52 and nut 53. Sealing disk 50 prevents leakage of pressurized fluid but permits plunger 46 to slide in sleeve 24. Bolt 52 extends sufficiently below plunger 46 to prevent plunger 46 from sliding below port 30.

Inside sleeve 24 above plunger 46 is hardenable binder material. It is preferable that the binder be comprised of at least two components that form the hardenable binder upon mixing, but which can be separately packaged in a burstable cartridge. For example, polyester binders sometimes used with rockbolts are packaged separately as resin and catalyst. A burstable cartridge 56 having chambers 56a and 56b for the separate binder components is provided in sleeve 24.

The upper end of sleeve 24 is closed with end plug 58. Four ports 60 are provided in the sidewall of sleeve 24, near the upper end. As shown in FIG. 2, ports 60 are equally spaced about the circumference of sleeve 24. A dish-like seal 62 is mounted on sleeve 24 above ports 60. The rim of seal 62 protrudes sufficiently to contact the walls of bore 22 to prevent upward seepage of the binder upon its extrusion. Because of the dish-like shape of seal 62, upward pressure forces the edges against the bore walls achieving an effective seal.

A cutter/mixer unit 64 is located in sleeve 24 above binder cartridge 56. There are many possible configurations for this unit. In the configuration shown, unit 64 comprises a cylindrical tube 66 having a circumferential ring 68 for centering the unit, trapping the cartridge skin, and channeling the flow of the binder components through tube 66. The bottom of tube 66 has a beveled cutting edge 70 for cutting the burstable chambered cartridge 56. Four ports 72 are provided in tube 66 above ring 68. As shown in FIG. 3, ports 72 are equally spaced about the circumference of tube 66 and are axially out of alignment with ports 60 in sleeve 24 to increase the turbulence and mixing of the binder components passing through unit 64.

To put rockbolt 20 in tension so that it compresses the rock between its ends, the ends of rockbolt 20 must be engaged to the rock. The lower end of rockbolt 20 engages the roof surface 36 via face plate 34. The upper end can be engaged to the rock with any of the mechanical anchors well known in the art. One such anchor 80 is shown in FIG. 1. A threaded stud 82 extends from the top of sleeve 24, as from end plug 58. An expansion shell 84 is mounted over stud 82, and has four vertical fingers 86 which have a plurality of inclined teeth 88 on their exteriors. An expander member 90 is threaded onto stud 82, and has four downwardly tapering ramp surfaces 92, each engaged by the back of one of fingers 86. Teeth 88 on fingers 86 engage the walls of bore 22 and prevent turning of expansion shell 84 or expander member 90. Rotation of stud 82 by turning sleeve 24 draws expander knob 90 downward, opening expansion shell 84. Knob 28 on the end of sleeve 24 facilitates the turning of sleeve 24. Once expansion shell 84 is as fully expanded as bore 22 will allow, the expander member 90 can no longer move downward. Further rotation causes stud 82 to thread upwardly, tensioning rockbolt 20, whose lower end is engaged to roof face 36, via plate 34, and compressing the rock between the ends of the rockbolt 20.

Once rockbolt 20 is tensioned, it can be operated to extrude the binder to encase sleeve 24. A source of pressurized fluid, such as water or air, is connected over port 30 and pressure is applied. Applicants have successfully used a pressure of approximately 2000 p.s.i. (140 kg/sq. cm) The pressure urges plunger 46 upward which urges chambered binder cartridge 56 upward against cutter/mixer unit 64. Edge 70 on cutter/mixer unit 64 cuts chambered cartridge 56, and continued pressure urges the binder components upward through tube 66, out through ports 72, upward and finally out through ports 60 in sleeve 24. By this point, the binder is thoroughly mixed and is forced down along the exterior of sleeve 24. Seal 62 prevents upward travel of the binder. It has also been observed that anchor 80 tends to block the bore and prevents the binder from leaking upward. The binder eventually surrounds rockbolt 20 on all sides and sets, firmly securing rockbolt 20 in bore 22. Alternatively, plunger 46 can be operated before rockbolt 20 is tensioned. If rockbolt 20 is tensioned after extrusion of the binder, the turning motion will aid mixing of the binder components.

Although operating the plunger with pressurized fluid is preferred, it is also possible to operate the plunger 46 mechanically as with a push rod (not shown) acting against the bottom of plunger 46.

A second embodiment of a rockbolt incorporating the invention is indicated as 100 in FIG. 5. Rockbolt 100 is similar to rockbolt 20, and corresponding parts are indicated by corresponding numerals. Rockbolt 100, however, does not have knob 28 depending from end plug 26 for turning sleeve 24. Rockbolt 100 also does not have ring 40 for engaging face plate 34. Instead, a threaded collar 102 is attached, as by welds at 104, to the outside of sleeve 24, near the lower end but above port 30. A nut 106 is threaded onto collar 102 and engages face plate 34.

Rockbolt 100 does not have a mechanical anchor as does rockbolt 20, but it can nonetheless be tensioned to compress the rock between its ends. The engagement of the lower end of rockbolt 100 has already been described. To engage the upper end of rockbolt 100 to the rock so that it can be tensioned, a burstable cartridge 108 having chambers 108a and 108b containing components of a hardenable binder material having an appreciably faster setting time than the binder material in chambered cartridges 56, is provided in the lower portion of sleeve 24, just above plunger 46. Upon extrusion of the contents of the sleeve 24, the faster setting binder in cartridge 108 is the last to be extruded and thus remains near the top of rockbolt 100. The faster setting binder sets and secures the top of rockbolt 100 before the rest of the binder sets, so rockbolt 100 can be tensioned. Rockbolt 100 can be tensioned by tightening nut 106 on threaded collar 102.

It is also possible to use the threaded collar 102 and nut 106 structure shown in FIGS. 5 and 6, on rockbolt 20 of the first embodiment when the upper end is engaged by a mechanical anchor. In this case, once the upper end is engaged with the mechanical anchor, nut 106 is tightened to tension the rockbolt, and then the contents of sleeve 24 are extruded by applying pressurized fluid through port 30.

The present invention can also be utilized in an untensioned rockbolt. In this case, the rockbolt may be like rockbolt 20 except that the mechanical anchor at the top may be omitted. The rockbolt can be inserted through face plate 34 into bore 22 and held in place while the binder in sleeve 24 is extruded and sets.

OPERATION

The operation of the various embodiments of the rockbolt is very similar. A network of bores 22 is drilled in the section of roof to be supported. Each rockbolt is inserted through a face plate 34 and into a bore 22.

If the rockbolt is of the first embodiment, 20, the mechanical anchor 80 at the top is operated. This is accomplished by turning sleeve 24 via knob 28 to draw expander member 90 down on stud 82 to expand expansion shell 84. When expansion shell 84 is as fully expanded as bore 22 will allow, expander member 90 can no longer move downward. Further turning causes stud 82 to thread up through expander member 90, tensioning sleeve 24.

If the rockbolt is like the second embodiment, 100, or is an untensioned type as described, the rockbolt is merely held in the bore.

A source of pressurized fluid, such as water or air is usually readily available at tunneling or mining sites. This source can be augmented with a pressure intensifying apparatus, such as a portable pump. The pressurized fluid source is attached over port 30, and the pressurized fluid urges plunger 46 upward in sleeve 24 pushing cartridge 56 against cutter/mixer unit 64. The cartridge is cut by edge 70 and continued pressure urges the binder components up, through tube 66 where they are mixed. Continued pressure eventually extrudes the mixed binder material from ports 60 on the upper portion of sleeve 24. The binder is prevented by seal 62 from traveling upward, and instead travels down between sleeve 24 and bore 22, encasing sleeve 24 in binder material.

If the rockbolt is like the second embodiment, 100, the last binder extruded is the fast setting binder from cartridge 108. Although the entire sleeve 24 is encased in binder, by the time the top sets the rest of the binder is still unset so rockbolt 100 can be tensioned by tightening nut 106 on collar 102.

Of course, if the rockbolt is of the untensioned type, no tension is applied. It is merely held in place until the binder sets.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

We claim:

1. A rockbolt for installation in a bore in the roof of an underground excavation to support the roof, comprising:
   a sleeve insertable into the bore having an upper and a lower end and means for defining at least one port in the sleeve near the upper end;
   a plunger in the sleeve sealingly engaging the sleeve but slideable in response to applied fluid pressure;
   hardenable binder material in the sleeve between the port and the plunger and;
   means for applying fluid pressure to the plunger to extrude the binder material from the port.

2. The rockbolt of claim 1 wherein the means for applying fluid pressure comprises means for connecting the portion of the sleeve below the plunger to a source of pressurized fluid.

3. The rockbolt of claim 1 further comprising means for engaging the sleeve, near the lower end, to the roof face.

4. The rockbolt of claim 3 wherein the means for engaging the sleeve to the roof face comprises means near the lower end of the sleeve for engaging a face plate engaging the roof face.

5. The rockbolt of claim 3 wherein the means for engaging the sleeve to the roof face comprises the threaded collar on the sleeve near the lower end and a nut threadingly engaged on the threaded collar and projecting sufficiently to engage a face plate engaging the roof face.

6. The rockbolt of claim 3 further comprising means for engaging the sleeve near the upper end, to the rock surrounding the bore.

7. The rockbolt of claim 6 wherein the means for engaging the sleeve to the rock surrounding the bore comprises an expandable anchor on the top of the sleeve.

8. The rockbolt of claim 6 further comprising means for tensioning the sleeve between the means for engaging the sleeve to the roof face and the means for engaging the sleeve to the rock surrounding the bore, to compress the rock therebetween.

9. The rockbolt of claim 1 further comprising a seal above the port, said seal engaging the surrounding rock when the rockbolt is installed in the bore and preventing upward travel of the binder material upon the binder extrusion from the sleeve.

10. The rockbolt of claim 1 wherein the hardenable binder materials is contained in at least one burstable cartridge.

11. The rockbolt of claim 9 wherein the hardenable binder comprises at least two components which form the hardenable binder material when mixed, and wherein the components are separately encapsulated in at least one burstable cartridge.

12. The rockbolt of claim 11 further comprising means for cutting the burstable cartridge and mixing the binder components in the sleeve.

13. The rockbolt of claim 12 wherein the means for cutting the burstable cartridge and mixing the components comprises a generally cylindrical tube with a chamfered bottom edge for cutting and a plurality of ports on the side of the tube for mixing.

14. The rockbolt of claim 1 wherein the hardenable binder material includes some binder material of appreciably faster setting time than the balance of the binder material, and wherein this faster setting binder material is below the balance of the binder material in the sleeve so that it is extruded last and remains near the upper end of the sleeve to secure the upper end of the sleeve in the bore before the balance of the binder material sets.

15. A rockbolt for installation in a bore in the roof of an underground excavation to support the roof, comprising:
   a sleeve insertable into the bore having an upper end and a lower end and means for defining at least one port in the sleeve near the upper end;
   a plunger in the sleeve sealingly engaging the sleeve but slideable in response to applied fluid pressure;
   hardenable binder material comprised of at least two components which form a hardenable binder material when mixed, separately encapsulated in at least one burstable cartridge, in the sleeve between the port and the plunger;

means for connecting the portion of the sleeve below the plunger to a source of pressurized fluid to operate the plunger to extrude the binder material and encase the sleeve in the bore; and, means for engaging the sleeve, near the lower end, to the roof face.

16. The rockbolt of claim 15 further comprising means for engaging the sleeve, near the upper end, to the rock surrounding the bore and means for tensioning the sleeve between the means for engaging the rock surrounding the bore and the means for engaging the roof face to compress the rock therebetween.

17. A method for supporting the roof of an underground excavation, comprising:

making a bore in the roof of the excavation;

inserting into the bore a sleeve having an upper and a lower end and means for defining at least one port in the sleeve near the upper end, the sleeve containing a plunger sealingly engaging the sleeve but slideable in response to applied fluid pressure, the sleeve further containing hardenable binder material between the port and the plunger; and, apply fluid pressure to the plunger to extrude the binder material to encase the sleeve in the bore.

18. The method of claim 17 wherein the step of applying fluid pressure to the plunger comprises connecting the portion of the sleeve below the plunger to a source of pressurized fluid to operate the plunger to extrude binder material.

19. The method of claim 18 further including the step of tensioning the sleeve to compress the rock between the upper and lower ends before extruding the binder material.

20. The method of claim 17 further including the step of tensioning the sleeve to compress the rock between its upper end lower ends after extruding the binder material.

21. The method of claim 17 wherein a portion of the hardenable binder material in the sleeve has an appreciably faster setting time than the balance of the binder material and wherein the faster setting binder material is below the balance of the binder material in the sleeve so that it is extruded last and remains near the top of the sleeve, the method further comprising the step of tensioning the sleeve to compress the rock between its upper and lower ends after the fast setting binder material has set but before the rest of the binder material sets.

22. A method for supporting the roof of an underground excavation, comprising:

making a bore in the roof of the excavation;

inserting into the bore a sleeve having an upper and an lower end, and means for defining at least one port in the sleeve near the upper end, the sleeve containing a plunger sealingly engaging the sleeve but slideable in response to applied fluid pressure, the sleeve further containing hardenable binder material between the port and the plunger, means for engaging the sleeve near the lower end to the roof face, and means for engaging the sleeve near the upper end to the rock surrounding the bore;

engaging the upper end of the sleeve to the rock surrounding the bore and the lower end of the sleeve to the roof face;

tensioning the sleeve to compress the rock between the upper and lower ends of the sleeve;

connecting the portion of the sleeve below the plunger to a source of pressurized fluid to operate the plunger to extrude the binder material to encase the sleeve.

23. A method for supporting the roof of an underground excavation, comprising:

making a bore in the roof of the excavation;

inserting into the bore a sleeve having an upper and a lower end and a means for defining at least one port in the sleeve near the upper end, the sleeve containing a plunger sealingly engaging the sleeve but slideable in response to applied fluid pressure, the sleeve further containing hardenable binder material between the port and the plunger, a portion of this binder material being of appreciably faster setting time than the balance of the binder material, the faster setting binder material being below the balance of the binder material in the sleeve so that it would be extruded last and would remain near the top of the sleeve, and means for engaging the sleeve, near the lower end, to the roof face;

connecting the portion of the sleeve below the plunger to a source of pressurized fluid to operate the plunger to extrude the binder material;

tensioning the sleeve after the faster setting binder material has set but before the balance of the binder material sets, to compress the rock between the upper and lower ends.

* * * * *